United States Patent
Yum et al.

(10) Patent No.: US 9,596,014 B2
(45) Date of Patent: Mar. 14, 2017

(54) METHOD AND APPARATUS FOR CANCELLING INTERFERENCE

(71) Applicant: LG Electronics Inc., Seoul (KR)

(72) Inventors: Kunil Yum, Seoul (KR); Hyungtae Kim, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 92 days.

(21) Appl. No.: 14/606,180

(22) Filed: Jan. 27, 2015

(65) Prior Publication Data

US 2015/0215017 A1 Jul. 30, 2015

Related U.S. Application Data

(60) Provisional application No. 61/932,716, filed on Jan. 28, 2014.

(51) Int. Cl.

| | | |
|---|---|---|
| *H04B 1/10* | (2006.01) | |
| *H04B 1/71* | (2011.01) | |
| *H04B 7/04* | (2006.01) | |
| *H04L 1/00* | (2006.01) | |
| *H04B 7/02* | (2006.01) | |
| *H04J 11/00* | (2006.01) | |
| *H04W 28/06* | (2009.01) | |

(52) U.S. Cl.
CPC ........ *H04B 7/0473* (2013.01); *H04B 7/024* (2013.01); *H04J 11/005* (2013.01); *H04L 1/00* (2013.01); *H04B 7/0452* (2013.01); *H04W 28/06* (2013.01)

(58) Field of Classification Search
CPC ........ H04B 7/0452; H04B 2201/70701; H04B 7/0413; H04B 7/024; H04B 7/0417
USPC ................................ 370/328, 329
See application file for complete search history.

(56) References Cited

U.S. PATENT DOCUMENTS

| 8,625,632 | B2* | 1/2014 | Roman | H04B 7/0452 |
| | | | | 370/468 |
| 8,687,555 | B2* | 4/2014 | Ko | H04L 1/0026 |
| | | | | 370/328 |
| 8,873,496 | B2* | 10/2014 | Moulsley | H04B 7/024 |
| | | | | 370/329 |

(Continued)

*Primary Examiner* — Steven H Nguyen
*Assistant Examiner* — Emmanuel Maglo
(74) *Attorney, Agent, or Firm* — Morgan, Lewis & Bockius LLP

(57) ABSTRACT

A method and apparatus for cancelling interference are disclosed. The method for cancelling interference, performed by a User Equipment (UE) includes receiving interference transmission layer restriction information about a neighbor Base Station (BS) transmitting an interference signal or information about the number of antenna ports used in transmitting the interference signal by the neighbor BS, detecting control information about the interference signal using the interference transmission layer restriction information, and removing the interference signal using the detected control information. The control information includes a field related to precoding of the interference signal determined differently according to a field related to Multiple User Multiple Input Multiple Output (MU-MIMO) included in the interference transmission layer restriction information, the information about the number of antenna ports, or the control information.

8 Claims, 14 Drawing Sheets

(56) References Cited

U.S. PATENT DOCUMENTS

| | | | |
|---|---|---|---|
| 2010/0027697 A1* | 2/2010 | Malladi | H04B 7/0417 375/260 |
| 2011/0194536 A1* | 8/2011 | Kim | H04L 5/0023 370/335 |
| 2012/0026964 A1* | 2/2012 | Koivisto | H04B 7/0452 370/329 |
| 2012/0082248 A1* | 4/2012 | Han | H04B 7/0413 375/259 |
| 2012/0170525 A1* | 7/2012 | Sorrentino | H04L 5/0007 370/329 |
| 2012/0230443 A1* | 9/2012 | Seok | H04B 7/0632 375/260 |
| 2012/0263081 A1* | 10/2012 | Li | H04B 7/0452 370/310 |
| 2012/0329498 A1* | 12/2012 | Koo | H04J 11/005 455/501 |
| 2013/0021991 A1* | 1/2013 | Ko | H04B 7/0413 370/329 |
| 2013/0107828 A1* | 5/2013 | Dinan | H04W 52/346 370/329 |
| 2013/0170366 A1* | 7/2013 | Prasad | H04W 72/085 370/252 |
| 2014/0071952 A1* | 3/2014 | Kim | H04L 5/001 370/335 |
| 2014/0098689 A1* | 4/2014 | Lee | H04B 7/0469 370/252 |
| 2014/0112280 A1* | 4/2014 | Lee | H04W 72/04 370/329 |
| 2014/0153488 A1* | 6/2014 | Koivisto | H04B 1/10 370/328 |
| 2015/0078282 A1* | 3/2015 | Chae | H04B 7/024 370/329 |
| 2016/0308591 A1* | 10/2016 | Lee | H04B 7/0452 |

* cited by examiner

METHOD AND APPARATUS FOR CANCELLING INTERFERENCE

This application claims the benefit of U.S. Provisional Application No. 61/932,716, filed on Jan. 28, 2014, which is hereby incorporated by reference as if fully set forth herein.

BACKGROUND OF THE INVENTION

Field of the Invention

The present invention relates to a wireless communication system, and more particularly, to a method and apparatus for performing interference cancellation.

Discussion of the Related Art

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

SUMMARY OF THE INVENTION

Accordingly, the present invention is directed to a method and apparatus for cancelling interference that substantially obviate one or more problems due to limitations and disadvantages of the related art.

An object of the present invention is to provide an interference cancellation method and a signaling method for efficient interference cancellation, using the interference cancellation method.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for cancelling interference, performed by a terminal includes receiving interference transmission layer restriction information about a neighbor Base Station (BS) transmitting an interference signal or information about the number of antenna ports used in transmitting the interference signal by the neighbor BS, detecting control information about the interference signal using the interference transmission layer restriction information or the information about the number of antenna ports, and performing cancellation of the interference signal using the detected control information. The control information may include a field related to precoding of the interference signal determined differently according to the interference transmission layer restriction information, the information about the number of antenna ports or a field related to Multiple User Multiple Input Multiple Output (MU-MIMO) included in the control information.

Additionally or alternatively, the interference transmission layer restriction information or the information about the number of antenna ports may determine the length of the field related to precoding of the interference signal.

Additionally or alternatively, if the field related to MU-MIMO indicates that the interference signal is configured for MU-MIMO, when the interference signal is based on 4-port Cell-specific Reference Signal (CRS), the field related to precoding of the interference signal may be assigned 6 bits, 4 lower bits out of the 6 bits may indicate a Precoding Matrix Indicator (PMI) of a first interference signal, and the remaining 2 bits may indicate a PMI of a second interference signal.

Additionally or alternatively, if the field related to MU-MIMO indicates that the interference signal is configured for MU-MIMO, when the interference signal is based on 2-port CRS, the field related to precoding of the interference signal may be assigned 6 bits, and only 1 bit out of the 6 bits may indicate a PMI of a first interference signal and a second interference signal.

Additionally or alternatively, if the interference transmission layer restriction information indicates 2 layers, the field related to precoding of the interference signal may be assigned 4 bits indicating indices 0 to 15 in the table below,

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 1 layer: TPMI = 0 | 0 | 2 layers: TPMI = 0 |
| . | . | 1 | 2 layers: TPMI = 1 |
| . | . | | |
| . | . | | |
| 3 | 1 layer: TPMI = 3 | 2 | 2 layers: Precoding according to the latest PMI report on PUSCH using the precoder(s) indicated by the reported PMI(s) |
| 4 | 1 layer: Precoding according to the latest PMI report on PUSCH using the precoder(s) indicated by the reported PMI(s) | 3 | OL MIMO with Large delay CDD (rank2) |
| 5 | 2 layer: TPMI = 0 | 4 | 2 layer, port 7, 8, SCID = 0 |
| 6 | 2 layer: TPMI = 1 | 5 | 2 layer, port 7, 8, SCID = 1 |
| 7 | OL MIMO with Large delay CDD (rank2) | 6-15 | reserved |
| 8 | 1 layer, port 7, SCID = 0 | | |
| 9 | 1 layer, port 7, SCID = 1 | | |
| 10 | 1 layer, port 8, SCID = 0 | | |
| 11 | 1 layer, port 8, SCID = 1 | | |
| 12 | (ReTx)2 layers, port 7, 8 | | |
| 13 | 2 layers: Transmit diversity | | |
| 14-15 | reserved | | |

Additionally or alternatively, a specific value of a field related to a modulation order in the detected control information may indicate whether codeword 1 is activated or not in the table.

In another aspect of the present invention, a terminal for performing interference cancellation includes a Radio Frequency (RF) unit, and a processor configured to control the RF unit. The processor may be configured to receive interference transmission layer restriction information about a neighbor Base Station (BS) transmitting an interference signal or information about the number of antenna ports used in transmitting the interference signal, to detect control information about the interference signal using the interference transmission layer restriction information or the information about the number of antenna ports, and to perform cancellation of the interference signal using the detected control information. The control information may include a field related to precoding of the interference signal determined differently according to the interference transmission layer restriction information, the information about the number of antenna ports or a field related to Multiple User Multiple Input Multiple Output (MU-MIMO) included in the control information.

Additionally or alternatively, the interference transmission layer restriction information or the information about the number of antenna ports may determine the length of the field related to precoding of the interference signal.

Additionally or alternatively, if the field related to MU-MIMO indicates that the interference signal is configured for MU-MIMO, when the interference signal is based on 4-port CRS, the field related to precoding of the interference signal may be assigned 6 bits, 4 lower bits out of the 6 bits may indicate a PMI of a first interference signal, and the remaining 2 bits may indicate a PMI of a second interference signal.

Additionally or alternatively, if the field related to MU-MIMO indicates that the interference signal is configured for MU-MIMO, when the interference signal is based on 2-port CRS, the field related to precoding of the interference signal may be assigned 6 bits, and only 1 bit out of the 6 bits may indicate a PMI of a first interference signal and a second interference signal.

Additionally or alternatively, if the interference transmission layer restriction information indicates 2 layers, the field related to precoding of the interference signal may be assigned 4 bits indicating indices 0 to 15 in the table below,

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 1 layer: TPMI = 0 | 0 | 2 layers: TPMI = 0 |
| . | . | 1 | 2 layers: TPMI = 1 |
| . | . | | |
| . | . | | |
| 3 | 1 layer: TPMI = 3 | 2 | 2 layers: Precoding according to the latest PMI report on PUSCH using the precoder(s) indicated by the reported PMI(s) |
| 4 | 1 layer: Precoding according to the latest PMI report on PUSCH using the precoder(s) indicated by the reported PMI(s) | 3 | OL MIMO with Large delay CDD (rank2) |
| 5 | 2 layer: TPMI = 0 | 4 | 2 layer, port 7, 8, SCID = 0 |
| 6 | 2 layer: TPMI = 1 | 5 | 2 layer, port 7, 8, SCID = 1 |
| 7 | OL MIMO with Large delay CDD (rank2) | 6-15 | reserved |
| 8 | 1 layer, port 7, SCID = 0 | | |
| 9 | 1 layer, port 7, SCID = 1 | | |
| 10 | 1 layer, port 8, SCID = 0 | | |

-continued

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 11 | 1 layer, port 8, SCID = 1 | | |
| 12 | (ReTx)2 layers, port 7, 8 | | |
| 13 | 2 layers: Transmit diversity | | |
| 14-15 | reserved | | |

Additionally or alternatively, a specific value of a field related to a modulation order in the detected control information may indicate whether codeword 1 is activated or not in the table.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
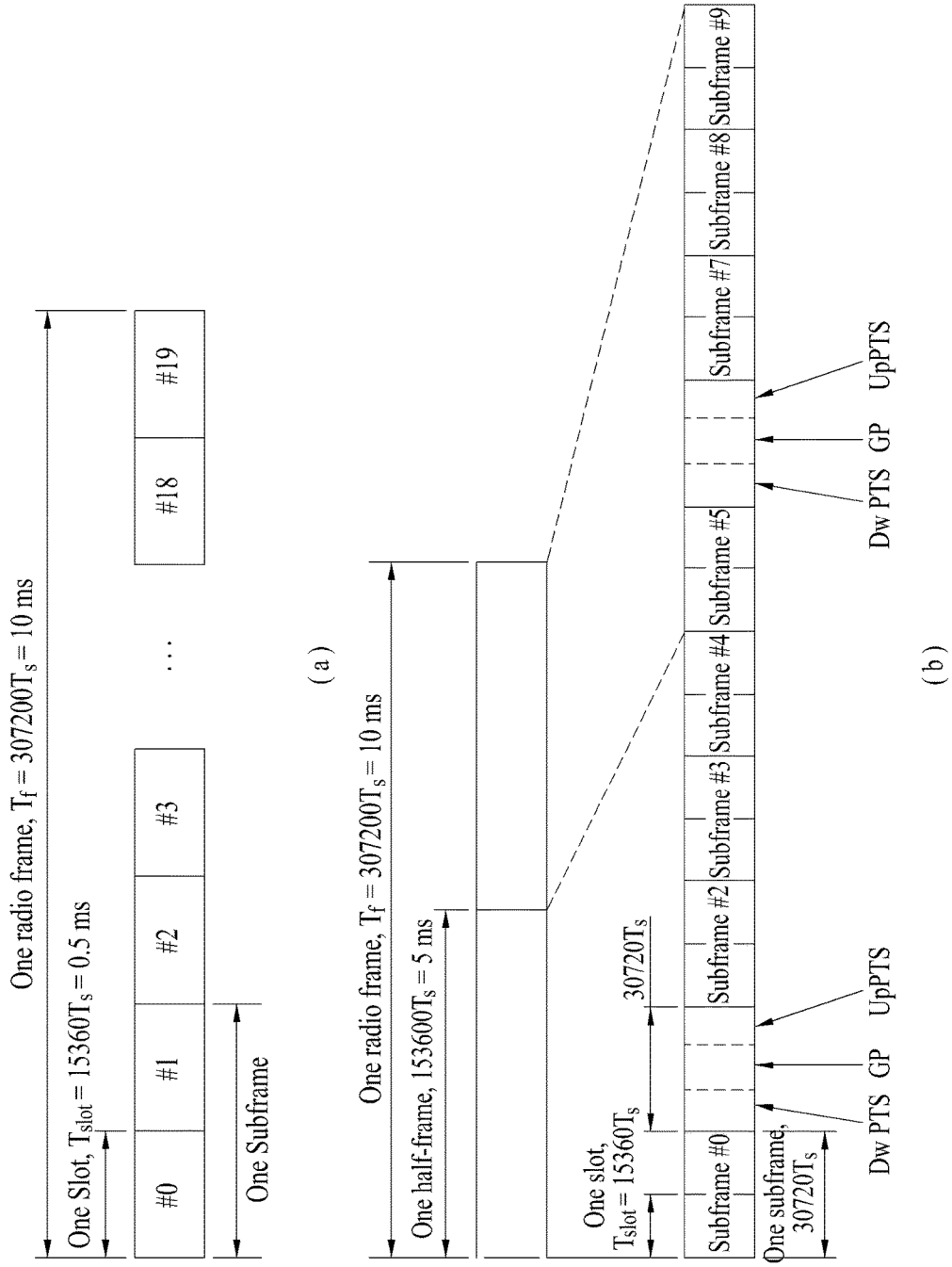
FIG. 1 illustrates an exemplary radio frame structure in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowledgement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
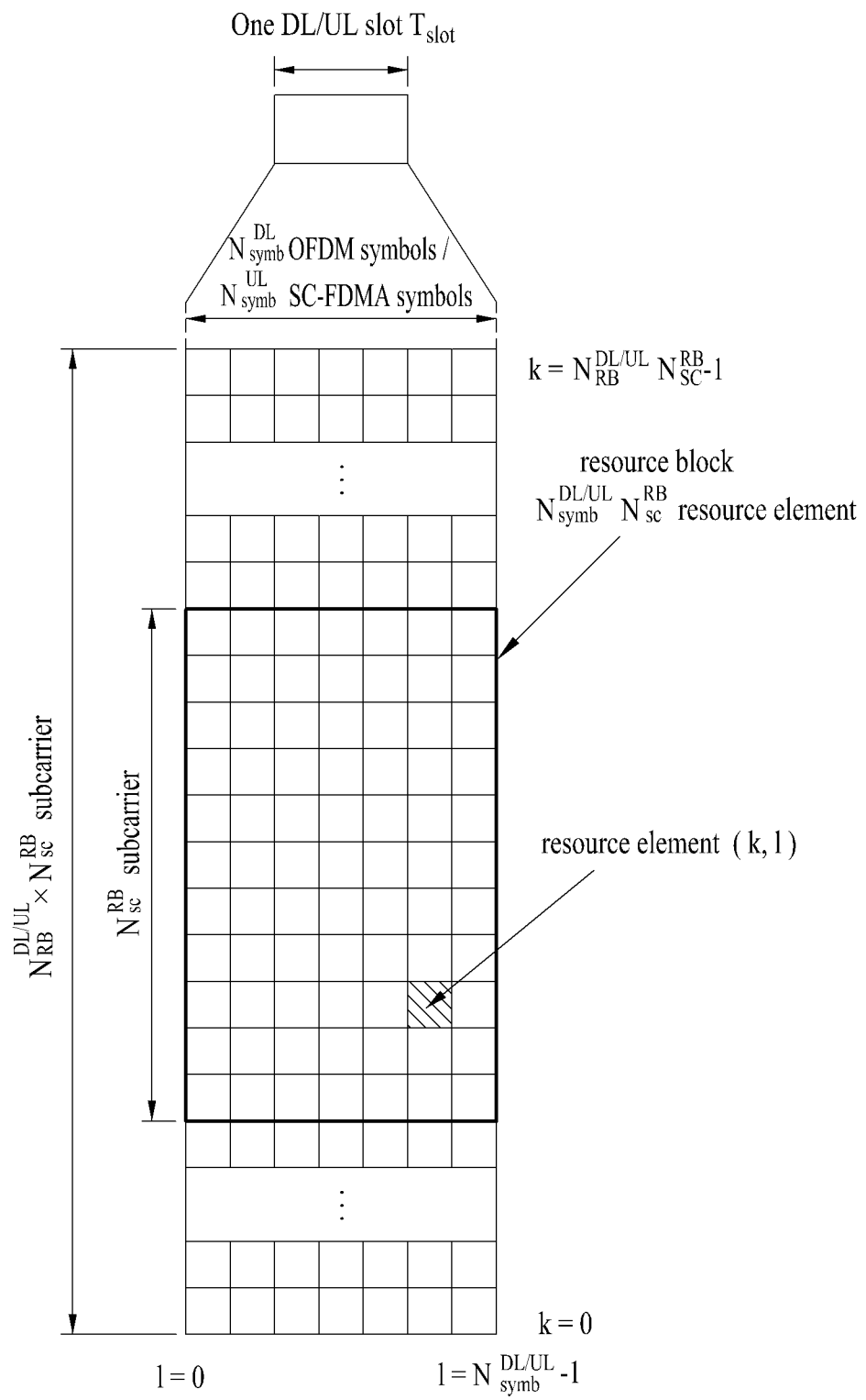
FIG. 2 illustrates an exemplary Downlink/Uplink (DL/UL) slot structure in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL}*N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL}*N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL}*N_{sc}^{RB}$ REs. Each RE in a resource grid can be uniquely defined by an index pair (k, l) in a slot. Here, k is an index in the range of 0 to $N_{symb}^{DL/UL}*N_{sc}^{RB}-1$ in the frequency domain and l is an index in the range of 0 to $N_{symb}^{DL/UL}-1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
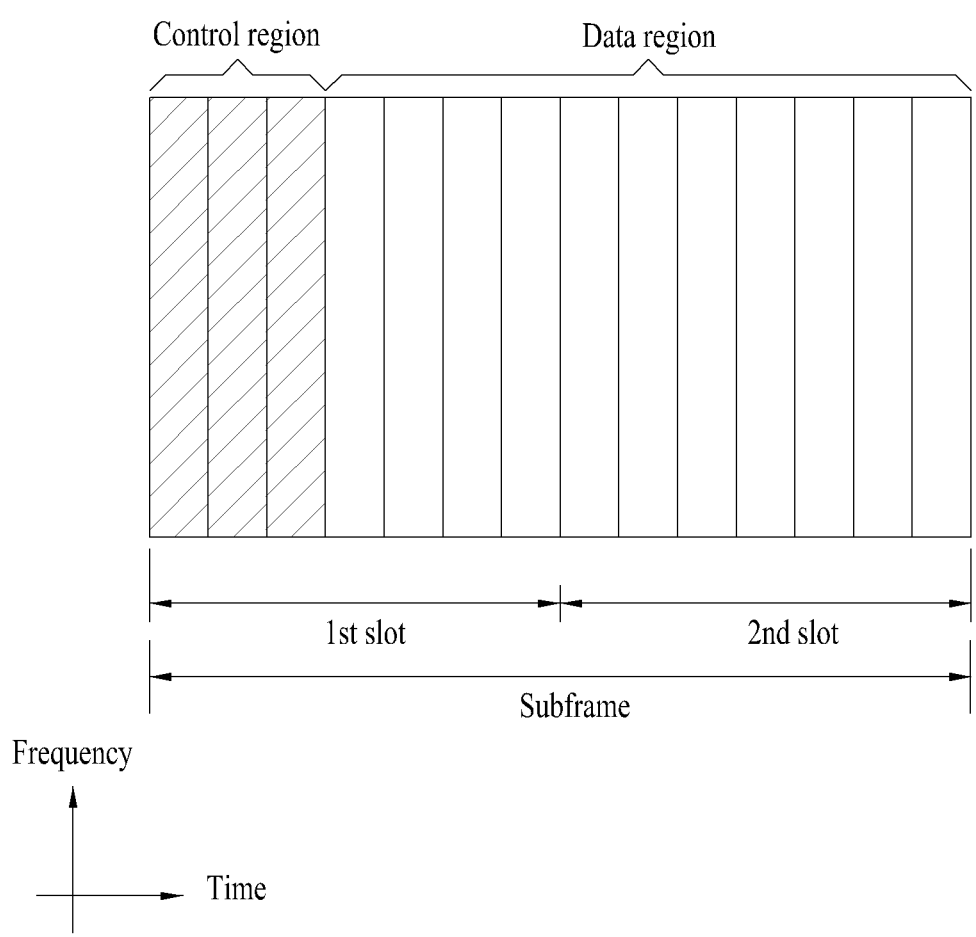
FIG. 3 illustrates an exemplary DL subframe structure in a 3$^{rd}$ Generation Partnership Project Long Term Evolution/Long Term Evolution-Advanced (3GPP LTE/LTE-A) system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| Search Space | | | Number of |
|---|---|---|---|
| Type | Aggregation Level L | Size [in CCEs] | PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
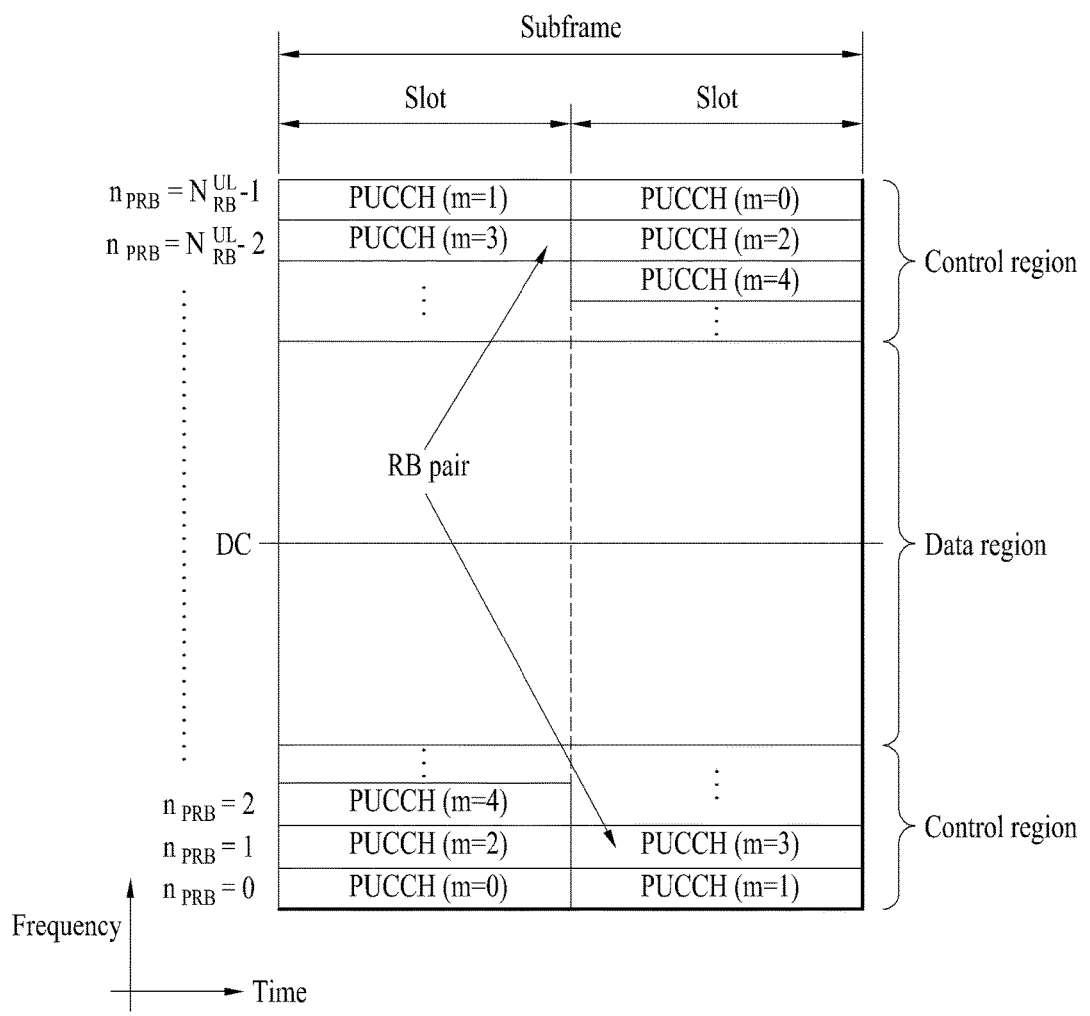
FIG. 4 illustrates an exemplary UL subframe structure in the 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (NACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

A network-based interference cancellation scheme or a Network Assisted Interference Cancellation and Suppression (NAICS) scheme is under discussion in an advanced wireless communication system such as LTE Rel-12 to remove interference data received from a neighbor cell or transmission point with assistance of a network.

Figure 5:
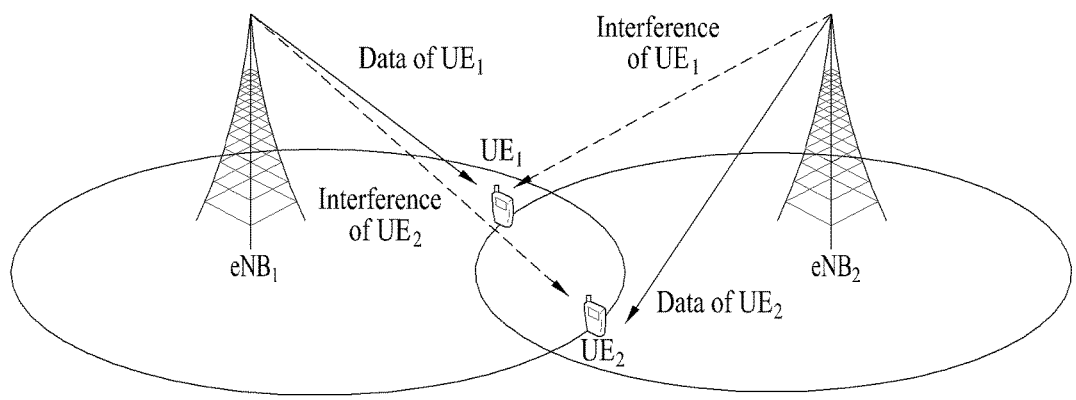
FIG. 5 illustrates an example of interference between cells or evolved Node Bs (eNBs) in a wireless communication system to which an embodiment of the present invention is applied.

FIG. 5 illustrates an interference environment in which in the case where there are a first UE ($UE_1$) serviced by a first eNB ($eNB_1$) and a second UE ($UE_2$) serviced by a second eNB ($eNB_2$) in an LTE system, data transmitted from $eNB_1$ to $UE_1$ interferes with $UE_2$ and data transmitted from $eNB_2$ to $UE_2$ interferes with $UE_1$ at the same time. Thus, $eNB_1$ is a serving cell to $UE_1$ and $eNB_2$ is an interfering cell to $UE_1$ in FIG. 5. If $UE_1$ or $UE_2$ performs the NAICS scheme, the UE may mitigate the effects of interference by attempting to demodulate or decode neighbor cell data and succeeding in removing interference data from a received signal. Such a UE that performs NAICS or has NAICS capabilities is referred to as a "NAICS UE" and an eNB that transmits an interference signal affecting a NAICS UE is referred to as an "interfering eNB".

To allow a NAICS UE to perform the NAICS scheme, a network transmits interference information helpful to implementation of the NAIC scheme to the NAICS UE. The interference information includes a Transmission Mode (TM), a modulation order, a Rank Indicator (RI), a Transmitted Precoding Matrix Indicator (TPMI), and scheduling information of an interfering cell. The interference information is transmitted to the NAICS UE in various manners, for use in NAICS. The interference information may be transmitted to the NAICS UE by semi-static signaling or dynamic signaling. Further, a serving cell may transmit the interference information or an interfering eNB may transmit control information about an interference signal directly.

If a backhaul between the eNBs is ideal, the interference information may be transmitted to the NAICS UE with a very short delay between the cells. On the contrary, in the case of a non-ideal backhaul, information is transmitted between the eNBs with a delay of at least several milliseconds and thus it is difficult to share information (e.g., a TPMI, a modulation order, scheduling information, etc.) representing dynamic channel characteristics through the backhaul between the eNBs. In this case, a method for sharing only semi-static information between eNBs and transmitting dynamic information on an assistant PDCCH by an interfering eNB so that UEs may use the information may be considered.

Figure 6:
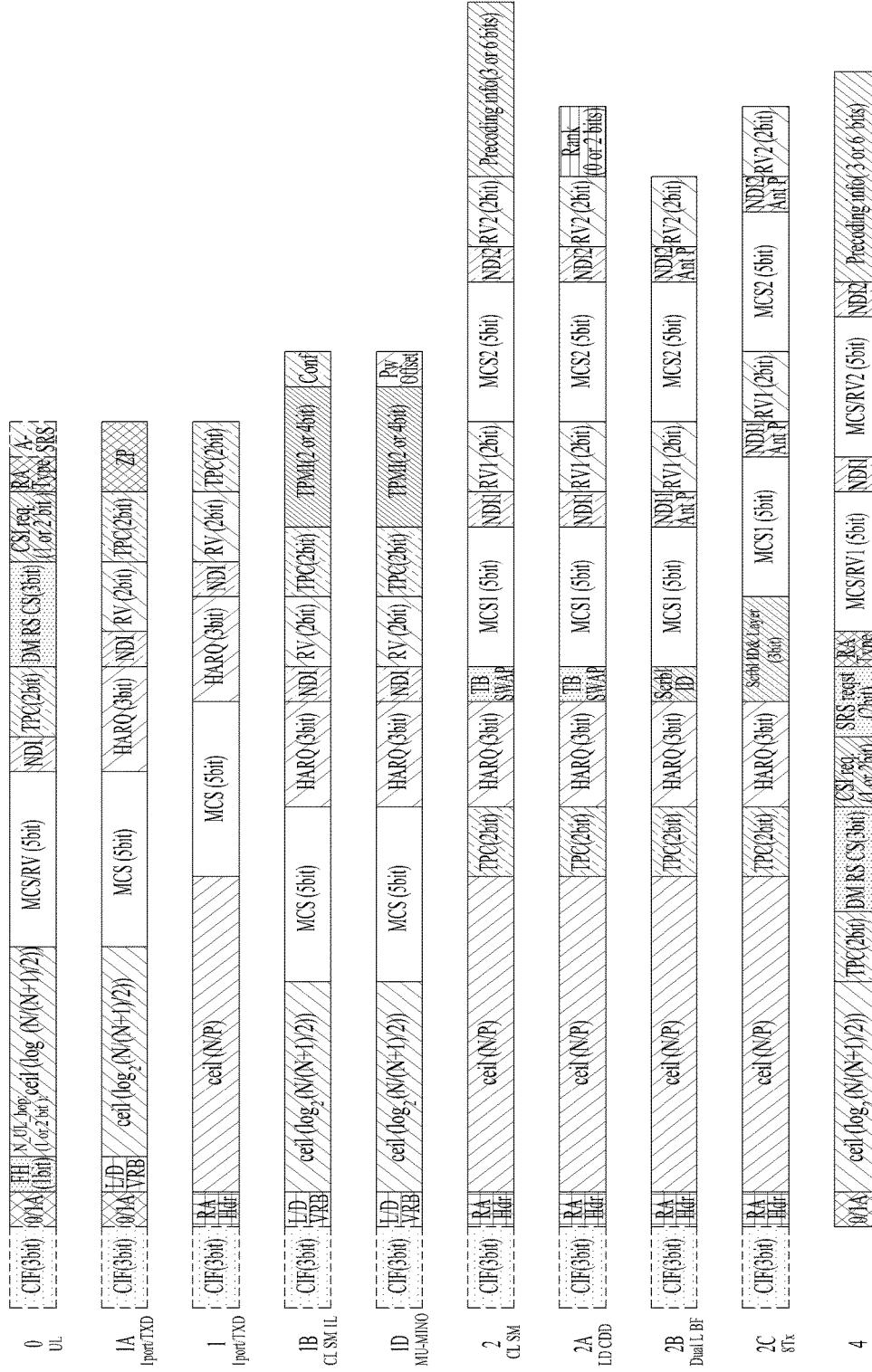
FIG. 6 illustrates Downlink Control Information (DCI) formats defined in a wireless communication system to which an embodiment of the present invention is applied.

The LTE standards define DCI formats to provide control information to UEs. FIG. 6 illustrates the types and structures of DCI formats used in 3GPP LTE release 10.

An eNB transmits control information for a UE served by the eNB according to a DCI format. To detect the DCI received from the serving eNB, the UE blind-decodes two DCI candidates for a TM indicated by TM information received by RRC signaling.

However, since an interfering eNB indicates a TM only to its served UE scheduled for a corresponding subband, a NAICS UE does not acquire knowledge of the TM of the interfering eNB (or the UE served by the interfering eNB) used in the subband. Accordingly, if the DCI formats illustrated in FIG. 6 are used as Assistant DCI (ADCI) for interference cancellation, the NAICS UE should perform blind decoding on all DCI formats except for two DCI formats, DCI formats 0 and 4 for UL, thereby causing too much overhead. In this context, the present invention proposes new ADCI formats that carry all information needed for a NAICS UE and reduce the number of candidate DCI formats, so that the NAICS UE may readily acquire interference information required for NAICS implementation.

Figure 7:
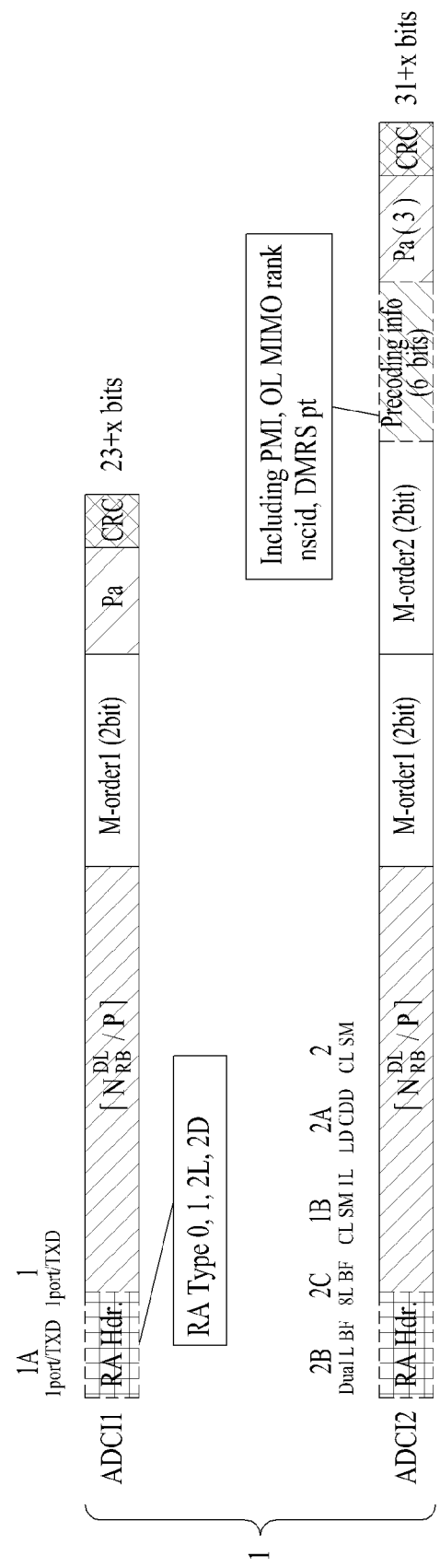
FIG. 7 illustrates Assistant DCI (ADCI) formats according to an embodiment of the present invention.

FIG. 7 illustrates ADCI formats proposed by the present invention. Two types of ADCI formats are illustrated in FIG. 7. Specifically, ADCI format 1 (ADCI1) incorporates DCI formats 1 and 1A for a single codeword and ADCI format 2 (ADCI2) incorporates DCI formats 1B, 2, 2A, 2B, and 2C for two codewords. For Resource Allocation (RA) type 1, the length x of each ADCI is 10, 17, and 25, respectively in system bandwidths of 10, 50, and 100 RBs.

Both ADCI format 1 and ADCI format 2 indicate RA type 0, 1, 2 localized, and 2 distributed using a conventional 1-bit RA header and a 2-bit L/D VRB instead of a 1-bit L/D VRB. In ADCI format 1 and ADCI format 2, an RA field ($\lceil N_{RB}^{DL}/P \rceil$) follows the RA header field, providing Resource Block (RB) allocation information. Because the size of an RA field of DCI 1A/1B is smaller than the size of a non-compact RA field of DCI 1/2/2A/2B/2C, the size of the RA field in the ADCI formats may be equal to that of the RA field in DCI 1/2/2A/2B/2C. In the ADCI format corresponding DCI 1A/1B, information may be set in the field, padded with 0s or 1s in the remaining part.

A modulation order (M-order1) field in ADCI format 1 indicates one of Quadrature Phase Shift Keying (QPSK), 16-ary Quadrature Amplitude Modulation (16QAM), and 64-ary QAM (64QAM) in 2 bits instead of a conventional 5-bit CQI field. However, in the case of dual codewords, one of the 2 bits is used to indicate 'codeword disable' for a second codeword. It is assumed herein that a specific state '00' indicates 'codeword disable'.

The following table illustrates a 6-bit field (i.e., 'Precoding Info') indicating a PMI, a DMRS port, and an SCID in ADCI format 2.

TABLE 5

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 4 layers: Transmit diversity | 0 | 2 layers: TPMI = 0 |
| 1 | 1 layer: TPMI = 0 | 1 | 2 layers: TPMI = 1 |
| 2 | 1 layer: TPMI = 1 | . | . |
| . | . | . | . |
| . | . | 15 | 2 layers: TPMI = 15 |
| . | . | . | . |
| 16 | 1 layer: TPMI = 15 | 16 | 2 layers: Precoding according to the latest PMI report on PUSCH using the precoder(s) indicated by the reported PMI(s) |
| 17 | 1 layer: Precoding according to the latest PMI report on PUSCH using the precoder(s) indicated by the reported PMI(s) | 17 | 3 layers: TPMI = 0 |
| 18 | 2 layers: TPMI = 0 | 18 | 3 layers: TPMI = 1 |
| 19 | 2 layers: TPMI = 1 | . | . |
| . | . | . | . |
| . | . | 32 | 3 layers: TPMI = 15 |
| . | . | . | . |
| 33 | 2 layers: TPMI = 15 | 33 | 3 layers: Precoding according to the latest PMI report on PUSCH using the precoder(s) indicated by the reported PMI(s) |
| 34 | 2 layers: Precoding according to the latest PMI report on PUSCH using the precoder(s) indicated by the reported PMI(s) | 34 | 4 layers: TPMI = 0 |
| 35 | OL MIMO with Large delay CDD (rank2) | 35 | 4 layers: TPMI = 1 |
| 36 | 1 layer, port 7, SCID = 0 | . | . |
| 37 | 1 layer, port 7, SCID = 1 | 49 | 4 layers: TPMI = 15 |
| 38 | 1 layer, port 8, SCID = 0 | 50 | 4 layers: Precoding according to the latest PMI report on PUSCH using the precoder(s) indicated by the reported PMI(s) |
| 39 | 1 layer, port 8, SCID = 1 | 51 | OL MIMO with Large delay CDD (rank2) |
| 40 | (ReTx)2 layers, port 7, 8 | 52 | OL MIMO with Large delay CDD (rank3) |
| 41 | (ReTx)3 layers, port 7~9 | 53 | OL MIMO with Large delay CDD (rank4) |
| 42 | (ReTx)4 layers, port 7~10 | 54 | 2 layer, port 7, 8, SCID = 0 |
| 43 | 2 layers: Transmit diversity | 55 | 2 layer, port 7, 8, SCID = 1 |
| 44-63 | reserved | 56 | 3 layer, port 7~9, SCID = 0 |
| | | 57 | 4 layer, port 7~10, SCID = 0 |
| | | 58 | 5 layer, port 7~11, SCID = 0 |
| | | 59 | 6 layer, port 7~12, SCID = 0 |
| | | 60 | 7 layer, port 7~13, SCID = 0 |
| | | 61 | 8 layer, port 7~14, SCID = 0 |
| | | 62 | reserved |
| | | 63 | reserved |

Index 0 to index 63 are interpreted differently depending on whether the second codeword is enabled or disabled. It is determined whether the second codeword is enabled or disabled according to the value of an 'M-order 2' field indicating the modulation order of the second codeword. That is, if the 'M-order 2' field is set to '00', the second codeword is disabled and the above table is interpreted as for a single codeword. If the 'M-order 2' field is set to a value other than '00', the second codeword is enabled and the above table is interpreted as for two codewords.

If the above table is interpreted as used for a single codeword, indexes 0 and 43 indicate that an interference signal is transmitted in Space Frequency Block Codes (SFBCs) for 4 layers and 2 layers, respectively. Indexes 1 to 16 and indexes 18 to 33 indicate PMIs defined for TM4 in 3GPP LTE Rel-8. If an interfering cell uses 2-port CRSs, the interfering cell uses only indexes 1 to 4 among those values and indexes 1 to 4 indicate rank-1 2Tx PMIs 0, 1, 2, and 3, respectively. In this case, the remaining indexes among indexes 1 to 16 and indexes 18 to 33 may be reserved or removed from the above table, thereby reducing the size of the table. If the interfering cell uses 4-port CRSs, indexes 1 to 16 indicate rank-1 4Tx PMIs 0 to 15 defined in 3GPPP LTE Rel-8 and indexes 1 to 33 indicate rank-2 4Tx PMIs 0 to 15 defined in 3GPPP LTE Rel-8.

Index 17 indicates the interfering cell's use of a rank-1 subband PMI according to the latest PUSCH subband CSI feedback received from a UE of the interfering cell. Because the NAICS UE is not aware of the PMI, if the corresponding field indicates index 17, the NAICS UE may not cancel corresponding interference or may detect the PMI by blind detection on a subband basis. Similarly to index 17, index 34 indicates the interfering cell's use of a rank-2 subband PMI according to the latest PUSCH subband CSI feedback received from a UE of the interfering cell. The UE assumes rank 2. In this case, the NAICS UE may not cancel the corresponding interference or may detect the PMI by blind detection on a subband basis, as is done with index 17.

To avert this situation, it is preferred that the interfering cell does not schedule a PDSCH that uses different PMIs in different subbands or if ever, the interfering cell does not provide interference information (ADCI) for the PDSCH. In this case, indexes 17 and 34 may be removed from the table, not used as reserved. Additionally, if the interfering eNB uses this scheduling, the interfering cell may transmit a TPMI of a specific index (e.g., the lowest subband) among subbands, rather than it does not provide the ADCI. In this case, the interfering eNB may indicate a full-band/subband PMI by means of an additional 1-bit flag.

Index 35 indicates Open-Loop (OL) MIMO using rank-2 large-delay Cyclic Delay Diversity (CDD). In this case, the NAICS UE assumes that the interfering cell transmits data using a precoder corresponding to the rank-2 large-delay CDD.

Indexes 36 to 42 indicate a transmission antenna port and a Scrambling Identity (SCID) value, when the interfering cell transmits data using DMRSs. Although information about all DMRSs corresponding to layer 1 to layer 4 may be signaled, the NAICS UE has difficulty in canceling interference for a high layer (for example, layer 3 or higher). Therefore, only a value for a low layer may be indicated, while an index corresponding to a high layer may be reserved for another usage. Unavailable indexes may also be reserved for other usages by limiting SCIDs and the number of available transmission antenna ports for the interfering cell.

On the other hand, if the above table is interpreted as used for two codewords, indexes 0 to 49 indicate PMIs defined for TM4 in 3GPP LTE Rel-8. If the interfering cell uses 2-port CRSs, only indexes 0 and 1 are used among the indexes and indicate rank-2 2Tx PMIs 0 and 1, respectively. In this case, the other indexes among index 0 to index 49 may be reserved or removed from the above table, to thereby reduce the size of the table. If the interfering cell uses 4-port CRSs, indexes 0 to 15 respectively indicate rank-2 4Tx PMIs 0 to 15 defined in 3GPP LTE Rel-8. Indexes 17 to 32 indicate rank-3 4Tx PMIs 0 to 15, respectively and indexes 34 to 49 indicate rank-4 4Tx PMIs 0 to 15, respectively.

Similarly to index 17 for a single codeword as described before, indexes 16, 33, and 50 for two codewords indicate the interfering cell's use of rank-2, rank-3, and rank-4 subband PMIs according to the latest PUSCH subband CSI feedback received from a UE of the interfering cell. In this case, the NAICS UE may not cancel corresponding interference or may detect the PMIs by blind detection on a subband basis. Further, to avert this situation, it is preferred that the interfering cell does not schedule a PDSCH that uses different PMIs in different subbands or if ever, the interfering cell does not provide interference information (ADCI) for the PDSCH. In this case, indexes 16, 33, and 50 may be removed from the table, not used as reserved. Additionally, if the interfering eNB uses this scheduling, the interfering cell may transmit a TPMI of a specific index (e.g., the lowest subband) among subbands, rather than it does not provide the ADCI. In this case, the interfering eNB may indicate a full-band/subband PMI by means of an additional 1-bit flag.

Indexes 51, 52, and 53 indicate open-loop MIMO schemes using rank-2, rank-3, and rank-4 large-delay CDDs, respectively. In this case, the NAICS UE assumes that the interfering cell transmits data using a precoder corresponding to a large-delay CDD.

If the above table is interpreted as used for two codewords, indexes 54 to 61 indicate transmission antenna ports and SCID values, when the interfering cell transmits data using DMRSs. Although information about all DMRSs corresponding to layer 2 to layer 8 may be signaled, the NAICS UE has difficulty in canceling interference for a high layer (for example, layer 3 or higher). Therefore, only a value for a low layer may be indicated, while an index corresponding to a high layer may be reserved for another usage. Unavailable indexes may also be reserved for other usages by limiting SCIDs and the number of available transmission antenna ports for the interfering cell.

If the interfering cell serves its UE using 2-port CRSs (hereinbelow, referred to as '2-port CRS-based interference'), some fields may not be used in the above table and thus the above table may be modified to the following table.

TABLE 6

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | reserved | 0 | 2 layers: TPMI = 0 |
| 1 | 1 layer: TPMI = 0 | 1 | 2 layers: TPMI = 1 |
| . | . | 2 | reserved |
| . | . | . | . |
| . | . | . | . |
| 4 | 1 layer: TPMI = 3 | . | . |
| . | . | . | . |
| . | . | . | . |
| 5 | reserved | 15 | reserved |
| . | . | 16 | 2 layers: Precoding according to the latest PMI report on PUSCH using the precoder(s) indicated by the reported PMI(s) |
| . | . | . | . |
| . | . | . | . |
| 16 | reserved | 17 | reserved |
| 17 | 1 layer: Precoding according to the latest PMI report on PUSCH using the precoder(s) indicated by the reported PMI(s) | . | . |
| 18 | 2 layer: TPMI = 0 | 50 | reserved |
| 19 | 2 layer: TPMI = 1 | 51 | OL MIMO with Large delay CDD (rank2) |
| 20 | reserved | 52 | reserved |
| . | . | 53 | reserved |
| . | . | . | . |
| . | . | . | . |
| 34 | reserved | 54 | 2 layer, port 7, 8, SCID = 0 |
| 35 | OL MIMO with Large delay CDD (rank2) | 55 | 2 layer, port 7, 8, SCID = 1 |
| 36 | 1 layer, port 7, SCID = 0 | 56 | 3 layer, port 7~9, SCID = 0 |
| 37 | 1 layer, port 7, SCID = 1 | 57 | 4 layer, port 7~10, SCID = 0 |
| 38 | 1 layer, port 8, SCID = 0 | 58 | 5 layer, port 7~11, SCID = 0 |
| 39 | 1 layer, port 8, SCID = 1 | 59 | 6 layer, port 7~12, SCID = 0 |
| 40 | (ReTx)2 layers, port 7, 8 | 60 | 7 layer, port 7~13, SCID = 0 |
| 41 | (ReTx)3 layers, port 7~9 | 61 | 8 layer, port 7~14, SCID = 0 |
| 42 | (ReTx)4 layers, port 7~10 | 62 | reserved |
| 43 | 2 layers: Transmit diversity | 63 | reserved |
| 44-63 | reserved | | |

Additionally, unnecessary states may be removed from [Table 6] as illustrated in the following table. Thus, in the case of 2-port CRS-based interference, the number of bits of the 'Precoding Info' field of ADCI format 2 may be reduced.

TABLE 7

| One codeword: Codeword 0 enabled, Codeword 1 disabled | | Two codewords: Codeword 0 enabled, Codeword 1 enabled | |
| --- | --- | --- | --- |
| Bit field mapped to index | Message | Bit field mapped to index | Message |
| 0 | 1 layer: TPMI = 0 | 0 | 2 layers: TPMI = 0 |
| . | . | 1 | 2 layers: TPMI = 1 |
| . | . | . | . |
| . | . | . | . |
| 3 | 1 layer: TPMI = 3 | 2 | 2 layers: Precoding according to the latest PMI report on PUSCH using the precoder(s) indicated by the reported PMI(s) |
| 4 | 1 layer: Precoding according to the latest PMI report on PUSCH using the precoder(s) indicated by the reported PMI(s) | 3 | OL MIMO with Large delay CDD (rank2) |
| 5 | 2 layer: TPMI = 0 | 4 | 2 layer, port 7, 8, SCID = 0 |
| 6 | 2 layer: TPMI = 1 | 5 | 2 layer, port 7, 8, SCID = 1 |
| 7 | OL MIMO with Large delay CDD (rank2) | 6 | 3 layer, port 7~9, SCID = 0 |
| 8 | 1 layer, port 7, SCID = 0 | 7 | 4 layer, port 7~10, SCID = 0 |
| 9 | 1 layer, port 7, SCID = 1 | 8 | 5 layer, port 7~11, SCID = 0 |
| 10 | 1 layer, port 8, SCID = 0 | 9 | 6 layer, port 7~12, SCID = 0 |
| 11 | 1 layer, port 8, SCID = 1 | 10 | 7 layer, port 7~13, SCID = 0 |
| 12 | (ReTx)2 layers, port 7, 8 | 11 | 8 layer, port 7~14, SCID = 0 |
| 13 | (ReTx)3 layers, port 7~9 | 12-15 | reserved |
| 14 | (ReTx)4 layers, port 7~10 | | |
| 15 | 2 layers: Transmit diversity | | |

TABLE 8

| One codeword: Codeword 0 enabled, Codeword 1 disabled | | Two codewords: Codeword 0 enabled, Codeword 1 enabled | |
| --- | --- | --- | --- |
| Bit field mapped to index | Message | Bit field mapped to index | Message |
| 0 | reserved | 0 | 2 layers: TPMI = 0 |
| 1 | 1 layer: TPMI = 0 | 1 | 2 layers: TPMI = 1 |
| . | . | 2 | Reserved |
| . | . | . | . |
| 4 | 1 layer: TPMI = 3 | . | . |
| . | . | . | . |
| 5 | reserved | 15 | reserved |
| . | . | 16 | 2 layers: Precoding according to the latest PMI report on PUSCH using the precoder(s) indicated by the reported PMI(s) |
| 16 | reserved | 17 | reserved |
| 17 | 1 layer: Precoding according to the latest PMI report on PUSCH using the precoder(s) indicated by the reported PMI(s) | . | . |
| 18 | 2 layer: TPMI = 0 | 50 | reserved |
| 19 | 2 layer: TPMI = 1 | 51 | OL MIMO with Large delay CDD (rank2) |
| 20 | reserved | 52 | reserved |
| . | . | 53 | reserved |
| . | . | | |
| 34 | reserved | 54 | 2 layer, port 7, 8, SCID = 0 |
| 35 | OL MIMO with Large delay CDD (rank2) | 55 | 2 layer, port 7, 8, SCID = 1 |
| 36 | 1 layer, port 7, SCID = 0 | 56-63 | reserved |
| 37 | 1 layer, port 7, SCID = 1 | | |
| 38 | 1 layer, port 8, SCID = 0 | | |
| 39 | 1 layer, port 8, SCID = 1 | | |
| 40 | (ReTx)2 layers, port 7, 8 | | |
| 41 | reserved | | |
| 42 | reserved | | |
| 43 | 2 layers: Transmit diversity | | |
| 44-63 | reserved | | |

If [Table 7] is used for 2-port CRS-based interference, the NAICS UE may interpret the 'Precoding Info' field of ADCI according to the number of antenna ports of the interfering eNB preliminarily received by, for example, RRC signaling. In this case, the length of a TPMI field of an ADCI format may be reduced from 6 bits to 4 bits and thus the total length of the ADCI format may be decreased by 2 bits. The NAICS UE may perform blind detection on the assumption of the modified structure of ADCI.

If the NAICS UE may perform NAICS on up to 2 layers of an interference signal, the interfering eNB may limit the maximum number of transmission layers to 2 by layer restriction for the NAICS UE. In this case, [Table 5] may be interpreted as the following table.

[Table 9] may be acquired by removing reserved bit fields from [Table 8].

TABLE 9

| One codeword: Codeword 0 enabled, Codeword 1 disabled | | Two codewords: Codeword 0 enabled, Codeword 1 enabled | |
| --- | --- | --- | --- |
| Bit field mapped to index | Message | Bit field mapped to index | Message |
| 0 | 1 layer: TPMI = 0 | 0 | 2 layers: TPMI = 0 |
| . | . | 1 | 2 layers: TPMI = 1 |
| . | . | . | . |
| . | . | . | . |

TABLE 9-continued

| One codeword: Codeword 0 enabled, Codeword 1 disabled | | Two codewords: Codeword 0 enabled, Codeword 1 enabled | |
| --- | --- | --- | --- |
| Bit field mapped to index | Message | Bit field mapped to index | Message |
| 3 | 1 layer: TPMI = 3 | 2 | 2 layers: Precoding according to the latest PMI report on PUSCH using the precoder(s) indicated by the reported PMI(s) |
| 4 | 1 layer: Precoding according to the latest PMI report on PUSCH using the precoder(s) indicated by the reported PMI(s) | 3 | OL MIMO with Large delay CDD (rank2) |
| 5 | 2 layer: TPMI = 0 | 4 | 2 layer, port 7, 8, SCID = 0 |
| 6 | 2 layer: TPMI = 1 | 5 | 2 layer, port 7, 8, SCID = 1 |
| 7 | OL MIMO with Large delay CDD (rank2) | 6-15 | reserved |
| 8 | 1 layer, port 7, SCID = 0 | | |
| 9 | 1 layer, port 7, SCID = 1 | | |
| 10 | 1 layer, port 8, SCID = 0 | | |
| 11 | 1 layer, port 8, SCID = 1 | | |
| 12 | (ReTx)2 layers, port 7, 8 | | |
| 13 | 2 layers: Transmit diversity | | |
| 14-15 | reserved | | |

If the interfering eNB is capable of limiting the maximum number of transmission layers to 2 and thus the above [Table 9] is used in a corresponding situation, the NAICS UE may determine which method between [Table 5] and [Table 9] is to be used in interpreting the 'Precoding Info' field of ADCI according to the maximum interference transmission layer restriction information received in advance by, for example, RRC signaling. If [Table 9] is used, the length of the 'Precoding Info' field of ADCI may be reduced from 6 bits to 4 bits and thus the ADCI may be transmitted with its total length decreased by 2 bits. The NAICS UE may perform blind decoding on the assumption of the modified structure.

The NAICS UE does not need to distinguish dual-layer retransmission of a single codeword from dual-layer transmission of two codewords. Therefore, the NAICS UE may use a 2-layer transmission field for two codewords instead of a 2-layer transmission field for a single codeword. In this case, to signal a corresponding TM, indexes 0 and 1 for two codewords may be transmitted instead of indexes 18 and 19 for a single codeword in [Table 6] and [Table 8], and indexes 0 and 1 for two codewords may be transmitted instead of indexes 5 and 6 for a single codeword in [Table 7] and [Table 9]. That is, in the case of a single codeword in [Table 5] to [Table 9], all indexes indicating 2 or more layers may be reserved or removed from the tables and the same may be indicated by an index for two codewords in the same table. If the same indication information cannot be found in the 2-codeword case, like index 13 for a single codeword in [Table 9], a new index representing the indication information for two codewords should be added.

In both ADCI formats 1 and 2 illustrated in FIG. 7, Pa represents existing 8 Pa states indicated by RRC signaling, in 3 bits. If actual available Pa values are limited to a part of the 8 Pa values by agreement between eNBs, the size of the Pa field may be reduced according to the number of the available Pa values and each state may be interpreted differently. For example, if eNBs agree on use of 4 upper Pa values only, the size of the Pa field is 2 bits and each state may be interpreted due to the setting of the 4 upper Pa values. If Pa is fixed to only one value in an extreme case, the Pa field may be removed from ADCI.

Figure 8:
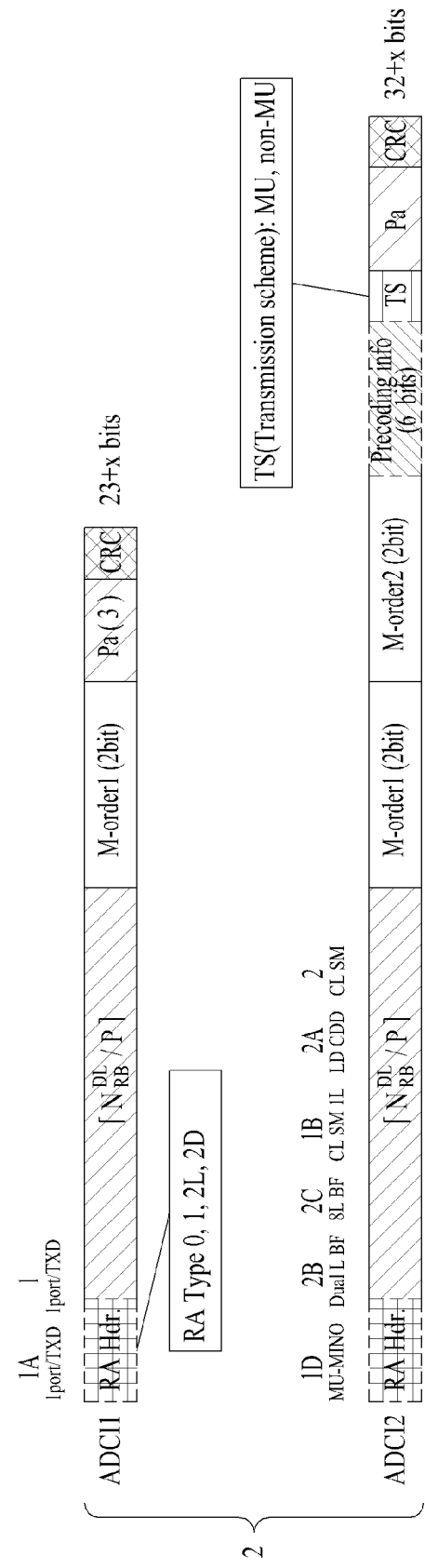
FIG. 8 illustrates ADCI formats according to an embodiment of the present invention.

FIG. 8 illustrates ADCI formats proposed by the present invention.

The ADCI formats proposed in FIG. 7 do not include DCI 1D. Accordingly, an ADCI format including DCI 1D is proposed herein.

The ADCI structure illustrated in FIG. 8 is different from the ADCI structure illustrated in FIG. 7 in that ADCI format 2 further includes one Transmission Scheme (TS) bit indicating MU MIMO or non-MU MIMO. If the TS bit is set to MU MIMO, the 'Precoding Info' field is defined in a different manner from the ADCI formats illustrated in FIG. 7. The 'Precoding Info' field is defined differently according to the number of CRS ports.

If an interference signal is based on 4-port CRSs, the 'Precoding Info' field may be interpreted as follows.

4 lower bits indicate a PMI of the interfering $UE_1$ subjected to MU-MIMO.

4 lower bits indicate a 4-port rank-1 PMI defined for TM4 of 3GPP LTE Rel-8. The remaining 2 upper bits indicate a PMI of the interfering $UE_2$ subjected to MU-MIMO.

2 upper bits are determined dependently on 4 lower bits. PMIs orthogonal to the PMI indicated by the 4 lower bits are mapped to the 2 upper bits, 00, 01, 10, and 11 in an ascending order of PMIs.

If an interference signal is based on 2-port CRSs, the TPMI field may be interpreted as follows.

An MU-MIMO precoder may be indicated just by 1 bit of the 6-bit field. That is, one of two 2-port rank-2 PMIs defined for TM4 in 3GPP LTE Rel-8 is indicated using the 1 bit. It is assumed that the interfering $UE_1$ and $UE_2$ operating in MU-MIMO use beam vectors of first and second layers, respectively.

Other fields than the above-described 'Precoding Info' field are used in the same manner as in the ADCI formats illustrated in FIG. 7.

Figure 9:
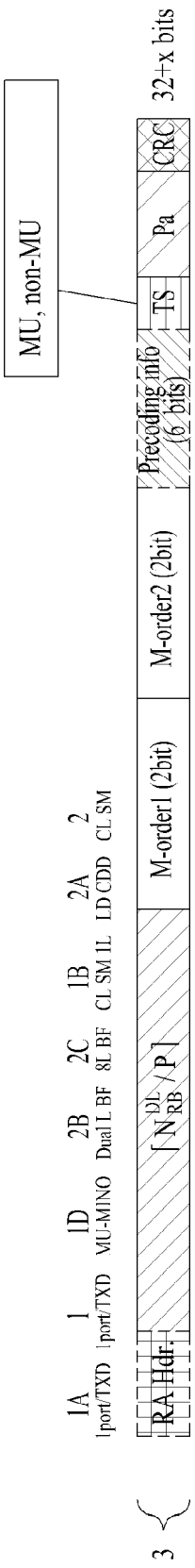
FIG. 9 illustrates ADCI formats according to an embodiment of the present invention.

FIG. 9 illustrates an ADCI format proposed by the present invention. ADCI format 1 and ADCI format 2 illustrated in FIG. 8 are incorporated into the ADCI format illustrated in FIG. 9. The fields of the ADCI format illustrated in FIG. 9 are identical to their counterparts in ADCI format 2 of FIG. 8.

Figure 10:
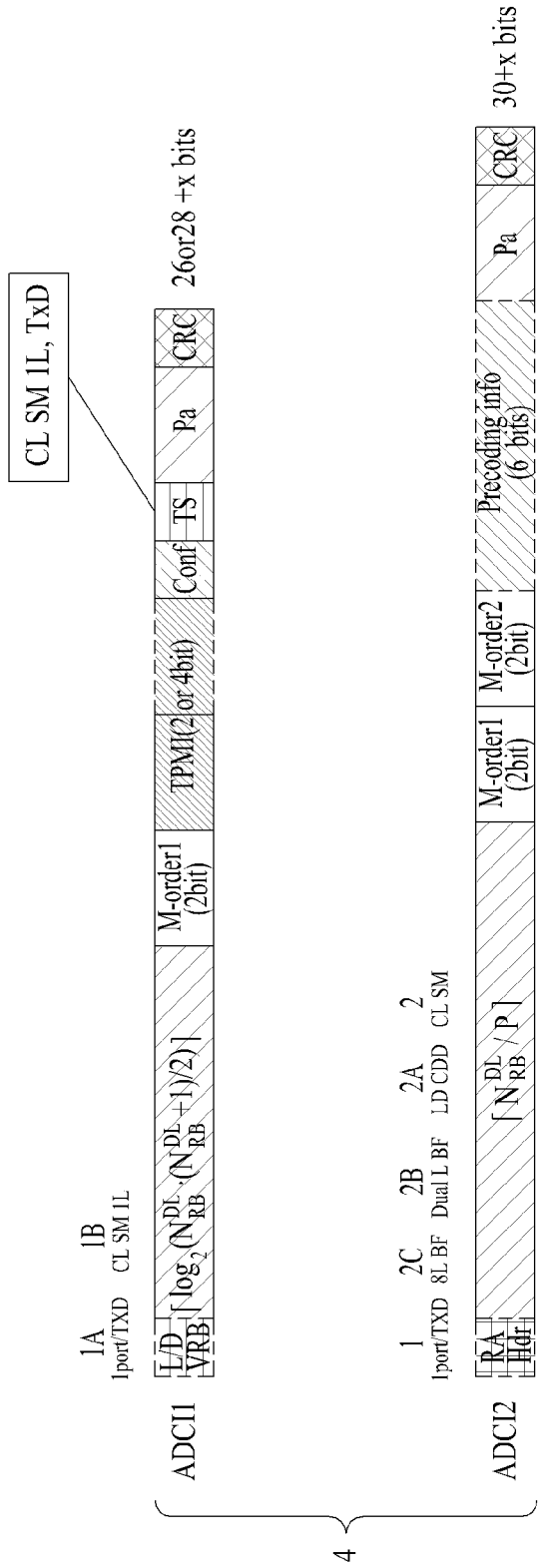
FIG. 10 illustrates ADCI formats according to an embodiment of the present invention.

FIG. 10 illustrates ADCI formats proposed by the present invention. Depending on whether each field is compressed, legacy DCI formats are divided into DCI formats 1A and 1B and DCI formats 1, 2, 2A, 2B, and 2C in the ADCI formats of FIG. 10.

In this case, the length of ADCI format 1 varies with the number of CRS ports in the interfering eNB. If the interfering eNB uses 2-port CRSs, the length of ADCI format 1 is 26+x bits and if the interfering eNB uses 4-port CRSs, the length of ADCI format 1 is 28+x bits. The NAICS UE determines the length of ADCI format 1 based on the number of CRS ports of the interfering eNB indicated in advance by RRC signaling. The length x of ADCI is 6, 11, and 13 respectively for system bandwidths of 10, 50, and 100 RBs in ADCI format 1, and 10, 17, and 25 respectively for system bandwidths of 10, 50, and 100 RBs in ADCI format 2.

In ADCI format 1, RA type 2 localized and RA type 2 distributed are distinguished by a 1-bit L/D VRB field instead of a 2-bit RA header field. A TS field distinguishes closed-loop MIMO for one layer (CL SM 1L) from transmit diversity (TxD) in ADCI format 1.

The TPMI field of ADCI format 1 is used as follows.

If a TS indicates TxD, the TPMI field is ignored because precoding information is not needed.

If the TS indicates CL SM 1L for one layer and a 'confirmation' field is activated, the TPMI field is interpreted according to the number of CRS ports in the interfering eNB.

A. If the interfering eNB uses 2-port CRSs, the TPMI field is 2 bits, indicating a 2-port rank-1 PMI defined for TM4 in 3GPP LTE Rel-8.

B. If the interfering eNB uses 4-port CRSs, the TPMI field is 4 bits, indicating a 4-port rank-1 PMI defined for TM4 in 3GPP LTE Rel-8.

If the TS indicates closed-loop MIMO for one layer and the 'confirmation' field is deactivated, this means that the interfering eNB uses a subband PMI of the latest PUSCH subband CSI feedback that it received from its UE. Herein, the TPMI field may indicate a PMI used in the lowest-index subband among subbands scheduled for the PDSCH of the interfering cell and the NAICS UE may perform NAICS only in the subband. Or the NAICS UE may not remove corresponding interference, ignoring the TPMI field or may detect the PMI by blind detection on a subband basis. Or the NAICS UE may remove the 'confirmation' field from ADCI. Then, if the interfering cell uses the subband PMI of the latest PUSCH subband CSI feedback that it received from its UE, it may not generate ADCI for the PDSCH or may restrict scheduling so that a plurality of subband PMIs may not be used for one PDSCH.

The 'Precoding Info' field of ADCI format 2 is used in the same manner described in regard to the ADCI formats of FIG. 7. Each field of ADCI format 2 may be used as described before with reference to the ADCI formats of FIG. 8.

Figure 11:
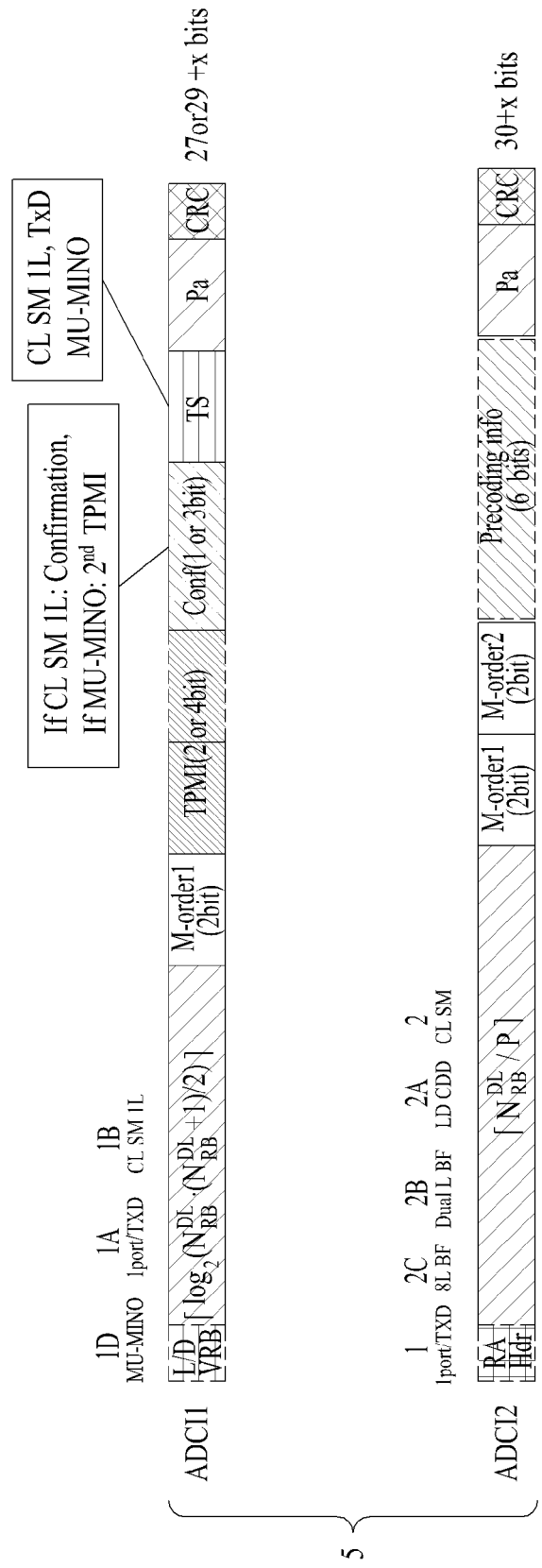
FIG. 11 illustrates ADCI formats according to an embodiment of the present invention.

FIG. 11 illustrates ADCI formats proposed by the present invention.

In the ADCI formats illustrated in FIG. 11, the length of ADCI format 1 varies with the number of CRS ports in the interfering eNB. If the interfering eNB uses 2-port CRSs, the length of ADCI format 1 is 26+x bits and if the interfering eNB uses 4-port CRSs, the length of ADCI format 1 is 28+x bits. In addition, closed-loop MIMO for one layer (CL SM 1L), transmit diversity (TxD), and MU-MIMO may be distinguished by a 2-bit TS in ADCI format 1.

A 'confirmation' field is used in combination with a TPMI field according to the values of the TS in ADCI format 1. If the TS does not indicate MU-MIMO, the TMPI field of ADCI format 1 illustrated in FIG. 11 is used in the same manner as the TPMI field of ADCI format 1 illustrated in FIG. 10.

If the TS indicates MU-MIMO, the TPMI field of ADCI format 1 illustrated in FIG. 11 indicates a precoder used for MU-MIMO. If the interfering eNB configures 2-port CRSs, it is assumed that the TPMI field indicates a 2-port rank-2 PMI defined for TM4 in 3GPP LTE Rel-8 and the interfering $UE_1$ and $UE_2$ operating in MU-MIMO use beam vectors of first and second layers, respectively. If the interfering eNB configures 4-port CRSs, the TPMI field of ADCI format 1 illustrated in FIG. 11 indicates a 4-port rank-1 PMI defined for TM4 in 3GPP LTE Rel-8. It is assumed that the interfering $UE_1$ uses this PMI. A PMI of the interfering $UE_2$ is indicated by a 'confirmation' field.

A 'Precoding Info' field of ADCI format 2 illustrated in FIG. 11 is used in the same manner as described before with reference to the ADCI formats illustrated in FIG. 7. The other fields are used in the same manner as their counterparts of the ADCI formats illustrated in FIG. 10.

While the present invention relates to ADCI carrying interference information to a NAICS UE, the present invention is also applicable to any transmission scheme in which control information is transmitted in radio resources.

Figure 12:
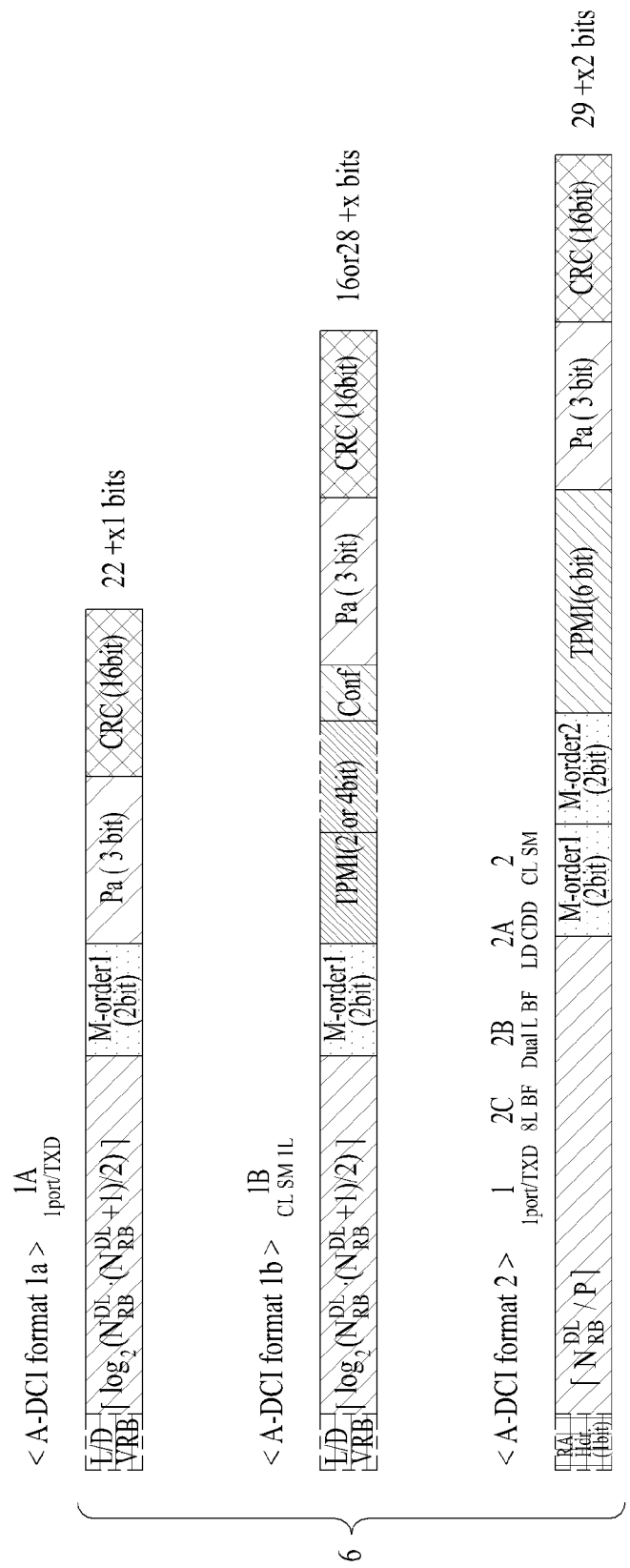
FIG. 12 illustrates ADCI formats according to an embodiment of the present invention.

Because ADCI format 1 illustrated in FIG. 10 includes interference information about 1-layer CL MIMO, it has a TPMI/TS/confirmation field. More simply, ADCI format 1 of FIG. 10 may be designed separately into two DCI formats, that is, ADCI format 1a and ADCI format 1b as illustrated in FIG. 12. Referring to FIG. 12, ADCI format 1a is used when the interfering eNB performs 1-port/TxD transmission and ADCI format 1b is used when the interfering eNB performs 1-layer CL MIMO transmission. ADCI format 2 is used as in FIG. 10. Each field of ADCI format 1b illustrated in FIG. 12 is interpreted in the same manner as when the TS indicates 1-layer CL MIMO in ADCI format 1 of FIG. 10. Each field of ADCI format 1a illustrated in FIG. 12 is interpreted in the same manner as when the TS indicates TxD in ADCI format 1 of FIG. 10.

According to the present invention, one ADCI includes interference information about one PDSCH transmitted by an interfering eNB. On the other hand, it may be contemplated that ADCI is configured so that one DCI includes specific interference information about a total band. This ADCI will be referred to as full-band ADCI. While information is represented, for example, on an RBG basis in the following table, it may be represented on the basis of various units.

TABLE 10

| RBG index | <ADCI 1> RS type (1 bit per RBG) | <ADCI 2> Modulation order 1 (2 bit per RBG) | <ADCI 3> Modulation order 2 (2 bit per RBG) | <ADCI 4> TPMI/DMRS port/nSCID (3 bit per RBG) |
|---|---|---|---|---|
| 1 | CRS | QPSK | 16QAM | PMI |
| 2 | CRS | QPSK | $2^{nd}$ codeword disabled | PMI |
| 3 | CRS | QPSK | QPSK | OL MIMO |
| 4 | CRS | 16QAM | $2^{nd}$ codeword disabled | TxD |
| 5 | CRS | 16QAM | 16QAM | PMI |
| 6 | DMRS | 16QAM | 64QAM | SCID, Port |
| ... | ... | ... | ... | ... |
| 25 | Dummy value | $1^{st}$ codeword disabled | $2^{nd}$ codeword disabled | Dummy value |
| Pay load for 100RB BW | 41 | 66 | 66 | 91 |

An embodiment of the present invention proposes ADCI indicating the type of interference information about a total band. For example, the interfering eNB may broadcast four ADCIs for a symbol-level NAICS receiver as illustrated in the above table. Each of the four ADCIs indicates an RS type, the modulation order of a first codeword, the modulation order of a second codeword, and a RPMI/DMRS/nSCID for use in demodulation of a PDSCH of the interfering eNB.

ADCI 2 and ADCI 3 enable the NAICS UE to determine the modulation order of an interference signal and an inactive codeword using 2 bits per RBG. ADCI 4 indicates different information according to an RS type set in ADCI 1. If the RS type is CRS, ADCI 4 indicates precoding information. Since CRS-based transmission schemes such as CL MIMO, OL MIMO, and TxD use different sets of precoders, the TPMI of ADCI 4 may need to indicate even OL MIMO by extending the legacy TPMI of DCI format 2 to the TPMI of ADCI 4. On the other hand, if the RS type is DMRS, ADCI 4 indicates a DMRS port and nSCID.

The NAICS UE may estimate the features of interference colliding with its PDSCH based on the full-band ADCI. For example, after decoding the interference, the NAICS UE may determine that RBG2 is transmitted based on a single-codeword CRS using QPSK and a specific PMI and the interfering eNB does not transmit data in RBG25.

ADCI 2 and ADCI 3 illustrated in [Table 10] are configured by incorporating 'M-order 1' and 'M-order 2' described before with reference to FIGS. 7 to 12 across a total band. ADCI 4 of [Table 9] is defined differently according to the RS type in ADCI 1. If the RS type is DMRS, a bit field of ADCI 4 is divided by 3 bits and thus interpreted as an SCID and an antenna port indication field defined in legacy DCI format 2C in every RBG. If the RS type is CRS, the bit field of ADCI 4 may be divided by 3 bits and thus interpreted as precoding information in each RBG.

If the RS type is CRS, ADCI 4 may indicate the following information. Meanwhile, since codeword-related information is also needed in interpreting the following table, information of ADCI 2 and ADCI 3 is also needed.

TABLE 11

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 2 layers: Transmit diversity | 0 | 2 layers: Precoding corresponding to precoder matrix $\frac{1}{2}\begin{bmatrix}1 & 1\\1 & -1\end{bmatrix}$ |
| 1 | 1 layer: Precoding corresponding to precoding vector $[1\ \ 1]^T/\sqrt{2}$ | 1 | 2 layers: Precoding corresponding to precoder matrix $\frac{1}{2}\begin{bmatrix}1 & 1\\j & -j\end{bmatrix}$ |
| 2 | 1 layer: Precoding corresponding to precoder vector $[1\ \ -1]^T/\sqrt{2}$ | 2 | Rank 2 OL MIMO |
| 3 | 1 layer: Precoding corresponding to precoder vector $[1\ \ j]^T/\sqrt{2}$ | 3-7 | reserved |
| 4 | 1 layer: Precoding corresponding to precoder vector $[1\ \ -j]^T/\sqrt{2}$ | | |
| 5-7 | reserved | | |

As described before, although full-band ADCI 4 uses 3 bits per RBG, 2 bits per RBG may be allocated to compact ADCI 4. Information illustrated in the following tables may be indicated depending on whether the RS type is CRS or DMRS.

TABLE 12

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 1 layer: Precoding corresponding to precoding vector $[1\ \ 1]^T/\sqrt{2}$ | 0 | 2 layers: Precoding corresponding to precoder matrix $\frac{1}{2}\begin{bmatrix}1 & 1\\1 & -1\end{bmatrix}$ |
| 1 | 1 layer: Precoding corresponding to precoder vector $[1\ \ -1]^T/\sqrt{2}$ | 1 | 2 layers: Precoding corresponding to precoder matrix $\frac{1}{2}\begin{bmatrix}1 & 1\\j & -j\end{bmatrix}$ |
| 2 | 1 layer: Precoding corresponding to precoder vector $[1\ \ j]^T/\sqrt{2}$ | 2 | Rank 2 OL MIMO |
| 3 | 1 layer: Precoding corresponding to precoder vector $[1\ \ -j]^T/\sqrt{2}$ | 3 | 2 layers: Transmit diversity |

TABLE 13

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 1 layer, port 7, SCID = 0 | 0 | 2 layer, port 7, 8, SCID = 0 |
| 1 | 1 layer, port 7, SCID = 1 | 1 | 2 layer, port 7, 8, SCID = 1 |
| 2 | 1 layer, port 8, SCID = 0 | 2 | reserved |
| 3 | 1 layer, port 8, SCID = 1 | 3 | reserved |

If the number of CRS ports is 4, full-band ADCI 4 should be modified. Specifically, the TPMI in each RBG may indicate an index of a modified table that does not include an index representing 'Precoding according to the latest PMI report on PUSCH' and an index indicating a DMRS port. Further, if the maximum number of layers in the interfering eNB is limited to 2, TPMI information in each RBG follows the following table.

TABLE 14

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 1 layer: TPMI = 0 | 0 | 2 layers: TPMI = 0 |
| 1 | 1 layer: TPMI = 1 | 1 | 2 layers: TPMI = 1 |
| . | . | . | . |
| . | . | . | . |
| . | . | . | . |

TABLE 14-continued

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 15 | 1 layer: TPMI = 15 | 15 | 2 layers: TPMI = 15 |
| 16 | 2 layers: Transmit diversity | 16 | OL MIMO with Large delay CDD (rank2) |
| 17-31 | reserved | 17-31 | reserved |

Figure 13:
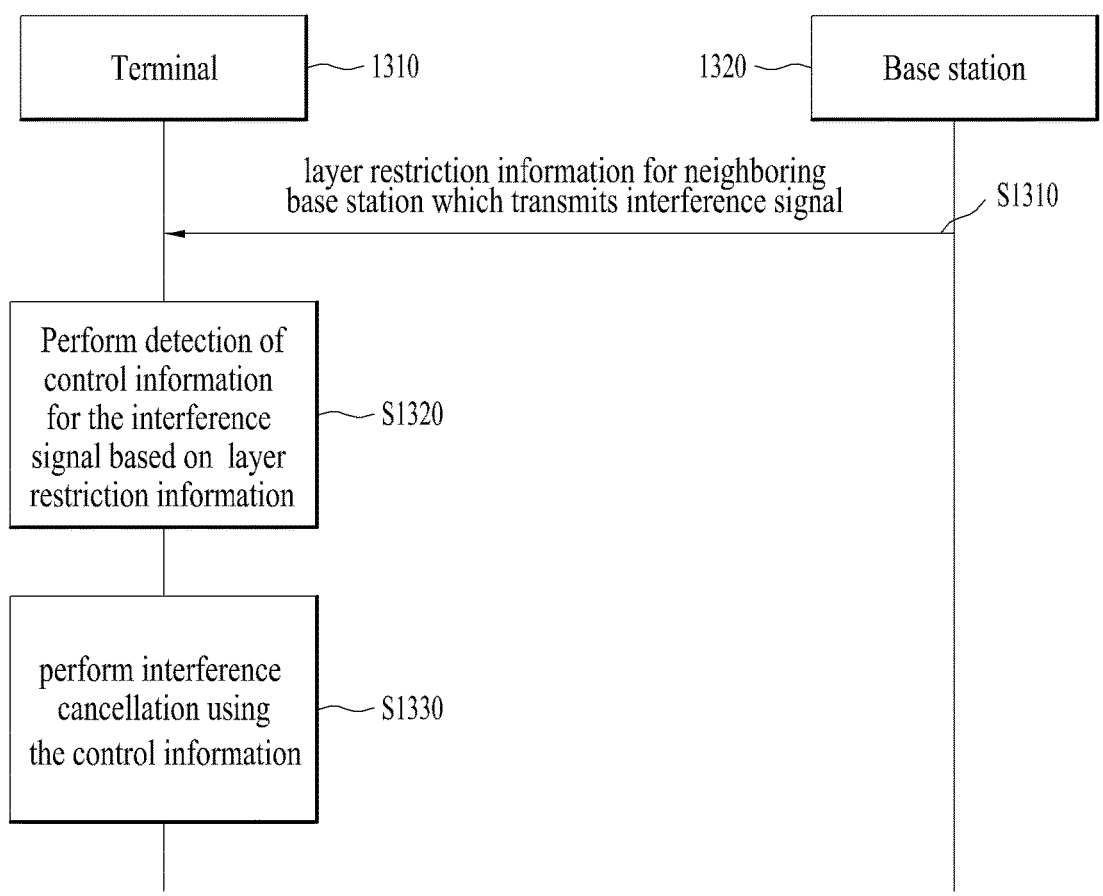
FIG. 13 is a diagram illustrating a signal flow for an operation according to an embodiment of the present invention.

FIG. 13 is a diagram illustrating a signal flow for an operation according to an embodiment of the present invention.

Referring to FIG. 13, a UE 1310 may receive information about restriction on interference transmission layers of a neighbor BS that transmits an interference signal or information about the number of antenna ports used in transmitting the interference signal from a BS 1320 (S1310). The interference transmission layer restriction information may be received from a serving BS of the UE 1310 or a neighbor BS. Accordingly, the BS 1320 may be the serving BS or the neighbor BS.

The UE 1310 may detect control information about the interference signal using the interference transmission layer restriction information or the information about the number of antenna ports (S1320).

The interference transmission layer restriction information may indicate a limited maximum number of transmission layers for the neighbor BS, determined according to NAICS capabilities of the UE 1310. For example, if the UE 1310 can remove interference signals of up to 4 layers by NAICS, the interference transmission layer restriction information may preferably indicate 4 or fewer layers.

The interference transmission layer restriction information or the information about the number of antenna ports may reduce the size of the control information. In other words, the interference transmission layer restriction information or the information about the number of antenna ports may determine the length of a field related to precoding of the control information.

The UE 1310 may remove the interference signal using the detected control information (S1330).

The control information may include a field related to precoding of the interference signal, which is determined differently according to an MU-MIMO-related field included in the interference transmission layer restriction information, the information about the number of antenna ports, or the control information. For details of this, refer to the description of [Table 5] to [Table 9].

More specifically, if the MU-MIO-related field indicates that the interference signal is for MU-MIMO and the interference signal is based on 4-port CRSs, 6 bits are allocated to the field related to precoding of the interference signal, with 4 lower bits indicating a PMI of a first interference signal and the other 2 bits indicating a PMI of a second interference signal.

If the MU-MIO-related field indicates that the interference signal is for MU-MIMO and the interference signal is based on 2-port CRS, 6 bits are allocated to the field related to precoding of the interference signal, with only one of the 6 bits indicating the PMIs of the first and second interference signals.

Figure 14:
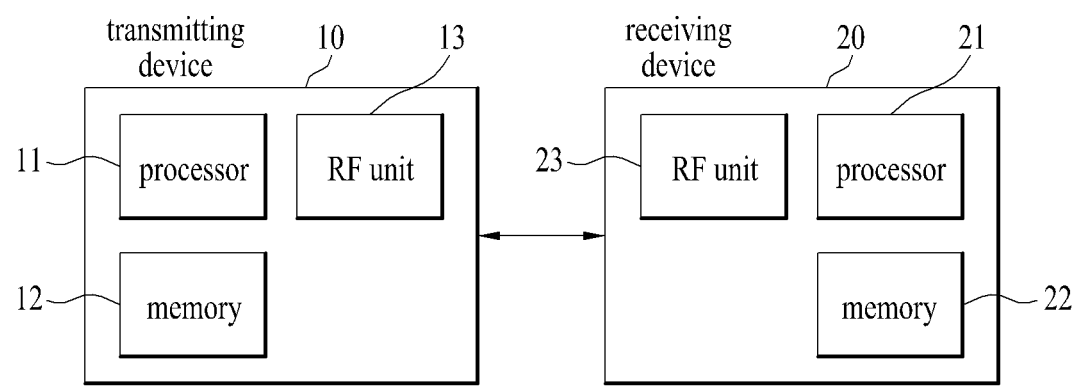
FIG. 14 is a block diagram of devices for implementing an embodiment(s) of the present invention.

FIG. 14 is a block diagram of a transmitting device 10 and a receiving device 20 configured to implement exemplary embodiments of the present invention. Referring to FIG. 14, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the RF unit 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include Nt (where Nt is a positive integer) transmit antennas.

A signal processing process of the receiving device 20 is the reverse of the signal processing process of the transmitting device 10. Under the control of the processor 21, the RF unit 23 of the receiving device 10 receives RF signals transmitted by the transmitting device 10. The RF unit 23 may include Nr receive antennas and frequency down-converts each signal received through receive antennas into a baseband signal. The RF unit 23 may include an oscillator for frequency down-conversion. The processor 21 decodes and demodulates the radio signals received through the receive antennas and restores data that the transmitting device 10 wishes to transmit.

The RF units 13 and 23 include one or more antennas. An antenna performs a function of transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. A signal transmitted through each antenna cannot be decomposed by the receiving device 20. A reference signal (RS) transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. An RF unit supporting a MIMO function of transmitting and receiving data using a plurality of antennas may be connected to two or more antennas.

In embodiments of the present invention, a UE serves as the transmitting device 10 on uplink and as the receiving device 20 on downlink. In embodiments of the present invention, an eNB serves as the receiving device 20 on uplink and as the transmitting device 10 on downlink.

The transmitting device and/or the receiving device may be configured as a combination of one or more embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

As is apparent from the foregoing description, interference can be canceled efficiently using interference cancellation information, and signaling for interference cancellation can be performed efficiently.

What is claimed is:

1. A method for performing interference cancellation, performed by a terminal, the method comprising:
receiving:
  interference transmission layer restriction information about a neighbor Base Station (BS) transmitting interference signal; and
  information about a number of antenna ports used in transmitting the interference signal;
detecting control information of the interference signal using:
  the interference transmission layer restriction information; and
  the information about the number of antenna ports; and
performing cancellation of the interference signal using the detected control information,
wherein the control information includes a field related to precoding of the interference signal determined differently according to the interference transmission layer restriction information, the information about the number of antenna ports or a field related to Multiple User Multiple Input Multiple Output (MU-MIMO) being included in the control information,
wherein the field related to MU-MIMO:
  includes 6 bits, and
  indicates that the interference signal is configured for MU-MIMO,
wherein, when the interference signal is based on 4-port Cell-specific Reference Signal (CRS):
  4 lower bits, among the 6 bits, indicate a Precoding Matrix Indicator (PMI) of a first interference signal, and
  a remaining 2 bits, among the 6 bits, indicate a PMI of a second interference signal, and
wherein, when the interference signal is based on 2-port CRS, only 1 bit, among the 6 bits, indicates a PMI of the first interference signal and the second interference signal.

2. The method according to claim 1, wherein the interference transmission layer restriction information or the information about the number of antenna ports determines a length of the field related to precoding of the interference signal.

3. The method according to claim 1, wherein, if the interference transmission layer restriction information indicates 2 layers, the field related to precoding of the interference signal including 4 bits indicating indices 0 to 15 as represented in the following table:

| One codeword: Codeword 0 enabled, Codeword 1 disabled | | Two codewords: Codeword 0 enabled, Codeword 1 enabled | |
| --- | --- | --- | --- |
| Bit field mapped to index | Message | Bit field mapped to index | Message |
| 0 | 1 layer: TPMI = 0 | 0 | 2 layers: TPMI = 0 |
| . | . | 1 | 2 layers: TPMI = 1 |
| . | . | | |
| 3 | 1 layer: TPMI = 3 | 2 | 2 layers: Precoding according to the latest PMI report on PUSCH using the precoder(s) indicated by the reported PMI(s) |
| 4 | 1 layer: Precoding according to the latest PMI report on PUSCH using the precoder(s) indicated by the reported PMI(s) | 3 | OL MIMO with Large delay CDD (rank2) |
| 5 | 2 layer: TPMI = 0 | 4 | 2 layer, port 7, 8, SCID = 0 |
| 6 | 2 layer: TPMI = 1 | 5 | 2 layer, port 7, 8, SCID = 1 |
| 7 | OL MIMO with Large delay CDD (rank2) | 6-15 | reserved. |
| 8 | 1 layer, port 7, SCID = 0 | | |
| 9 | 1 layer, port 7, SCID = 1 | | |
| 10 | 1 layer, port 8, SCID = 0 | | |
| 11 | 1 layer, port 8, SCID = 1 | | |
| 12 | (ReTx)2 layers, port 7, 8 | | |

-continued

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 13 | 2 layers: Transmit diversity | | |
| 14-15 | reserved | | |

4. The method according to claim 3, wherein a specific value of a field related to a modulation order in the detected control information indicates whether Codeword 1 is activated or not in the table.

5. A terminal for cancelling interference, the UE comprising:
a Radio Frequency (RF) unit; and
a processor configured to:
control the RF unit;
receive:
interference transmission layer restriction information about a neighbor Base Station (BS) transmitting an interference signal; and
information about a number of antenna ports used in transmitting the interference signal;
detect control information about the interference signal using:
the interference transmission layer restriction information; and
the information about the number of antenna ports; and
to perform cancellation of the interference signal using the detected control information,
wherein the control information includes a field related to precoding of the interference signal determined differently according to the interference transmission layer restriction information, the information about the number of antenna ports or a field related to Multiple User Multiple Input Multiple Output (MU-MIMO) being included in the control information,
wherein the field related to MU-MIMO:
includes 6 bits, and
indicates that the interference signal is configured for MU-MIMO,
wherein, when the interference signal is based on 4-port Cell-specific Reference Signal (CRS):
4 lower bits, among the 6 bits, indicate a Precoding Matrix Indicator (PMI) of a first interference signal, and
a remaining 2 bits, among the 6 bits, indicate a PMI of a second interference signal, and
wherein, when the interference signal is based on 2-port CRS, only 1 bit, among the 6 bits, indicates a PMI of the first interference signal and the second interference signal.

6. The UE according to claim 5, wherein the interference transmission layer restriction information or the information about the number of antenna ports determines a length of the field related to precoding of the interference signal.

7. The UE according to claim 5, wherein, if the interference transmission layer restriction information indicates 2 layers, the field related to precoding of the interference signal including 4 bits indicating indices 0 to 15 as represented in the following table:

| One codeword: Codeword 0 enabled, Codeword 1 disabled | | Two codewords: Codeword 0 enabled, Codeword 1 enabled | |
|---|---|---|---|
| Bit field mapped to index | Message | Bit field mapped to index | Message |
| 0 | 1 layer: TPMI = 0 | 0 | 2 layers: TPMI = 0 |
| . | . | 1 | 2 layers: TPMI = 1 |
| . | . | | |
| 3 | 1 layer: TPMI = 3 | 2 | 2 layers: Precoding according to the latest PMI report on PUSCH using the precoder(s) indicated by the reported PMI(s) |
| 4 | 1 layer: Precoding according to the latest PMI report on PUSCH using the precoder(s) indicated by the reported PMI(s) | 3 | OL MIMO with Large delay CDD (rank2) |
| 5 | 2 layer: TPMI = 0 | 4 | 2 layer, port 7, 8, SCID = 0 |
| 6 | 2 layer: TPMI = 1 | 5 | 2 layer, port 7, 8, SCID = 1 |
| 7 | OL MIMO with Large delay CDD (rank2) | 6-15 | reserved. |
| 8 | 1 layer, port 7, SCID = 0 | | |
| 9 | 1 layer, port 7, SCID = 1 | | |
| 10 | 1 layer, port 8, SCID = 0 | | |
| 11 | 1 layer, port 8, SCID = 1 | | |
| 12 | (ReTx)2 layers, port 7, 8 | | |
| 13 | 2 layers: Transmit diversity | | |
| 14-15 | reserved | | |

8. The UE according to claim 7, wherein a specific value of a field related to a modulation order in the detected control information indicates whether Codeword 1 is activated or not in the table.

* * * * *